United States Patent Office 3,634,455
Patented Jan. 11, 1972

3,634,455
2,3-DISUBSTITUTED 3H-INDOL-3-OLS AND A PROCESS OF PRODUCTION THEREFOR
Daniel Lednicer, Portage, Mich., assignor to The Upjohn Company, Kalamazoo, Mich.
No Drawing. Filed May 28, 1969, Ser. No. 828,740
Int. Cl. C07d 27/56
U.S. Cl. 260—326.13                                24 Claims

ABSTRACT OF THE DISCLOSURE 2,3-disubstituted 3H-indol-3-ols of the formula

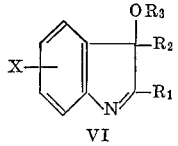

VI wherein X is hydrogen, alkyl of 1 to 3 carbon atoms, inclusive, halogen of —$CF_3$; wherein $R_1$ and $R_2$ are phenyl of the formula —$C_6H_4Z$ wherein Z is hydrogen, alkyl defined as above, alkoxy of 1 to 3 carbon atoms, inclusive, halogen or $CF_3$, or one of the parameters $R_1$ and $R_2$ is alkyl defined as above; and wherein $R_3$ is hydrogen,

in which $R_4$ is alkyl defined as above, benzyl or

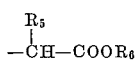

in which $R_5$ is hydrogen or methyl and $R_6$ is hydrogen or alkyl of 1 to 4 carbon atoms, inclusive, are produced from o-aminophenones. The 2,3-disubstituted 3H-indol-3-ols and the O-acids, esters and ethers thereof are sedatives and tranquilizers which can be used for mammals and birds.

BACKGROUND OF THE INVENTION

Field of the invention

This invention is directed to new organic compounds and is particularly concerned with novel 2,3-disubstituted 3H-indol-3-ols and a process for the production thereof.
The novel compounds and the process of production therefor can be illustratively represented as follows:

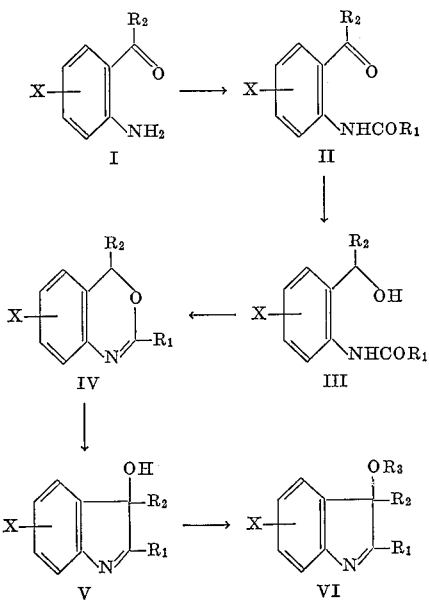

wherein X is selected from the group consisting of hydrogen, alkyl of 1 to 3 carbon atoms, inclusive, halogen or —$CF_3$; wherein $R_1$ and $R_2$ are phenyl of the formula —$C_6H_4Z$ in which Z is selected from the group consisting of hydrogen, alkyl defined as above, alkoxy of 1 to 3 carbon atoms, inclusive, halogen and —$CF_3$, or one of the parameters $R_1$ and $R_2$ is alkyl defined as above; and wherein $R_3$ is selected from the group consisting of hydrogen, benzyl,

in which $R_4$ is alkyl defined as above, and

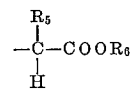

in which $R_5$ is selected from the group consisting of hydrogen and methyl, and $R_6$ is selected from the group consisting of hydrogen and alkyl of 1 to 4 carbon atoms, inclusive.

The process of the invention comprises: Acylating with an acid chloride of the formula $R_1COCl$, wherein $R_1$ is as defined above, an o-aminophenone (I) to obtain the amido ketone (II); reducing II with a metal hydride to obtain the amido alcohol of Formula III; treating compound III with a Lewis acid, e.g., sulfuric acid, hydrobromic acid or preferably phosphorus tribromide to obtain the 4H-3,1-benzoxazine (IV); treating IV in liquid ammonia with sodium or potassium amide to obtain the 2,3-disubstituted 3H-indol-3-ol (V); treating V with an acylation agent, e.g., acid chloride or acid anhydride, or etherifying V with an activated halogen compound, e.g. benzyl bromide, or treating V with an ester of the formula

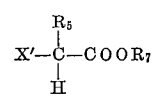

wherein X is chlorine or bromine, $R_5$ is hydrogen or methyl and $R_7$ is alkyl of 1 to 4 carbon atoms, inclusive, which can be followed by hydrolysis of the ester group, provides the compounds of Formula VI.

DESCRIPTION OF THE PREFERRED EMBODIMENTS

Examples of alkyl groups containing from 1 to 3 carbon atoms, inclusive, are methyl, ethyl, propyl and isopropyl. Examples of alkyl groups of 1 to 4 carbon atoms, inclusive, are butyl, isobutyl and secondary butyl together with the above listed alkyls of 1 to 3 carbon atoms, inclusive.

Examples of alkoxy groups containing from 1 to 3 carbon atoms, inclusive, are methoxy, ethoxy, propoxy and isopropoxy.

Examples of halogen are fluorine, chlorine and bromine.

The novel compounds of Formula VI have sedative, tranquilizing and anticonvulsant activity.

Sedative-tranquilizing effects were measured by Chimney test [Med. Exp. 4, 11 (1961)]; the Dish test and the Pedestal test.

Chimney test: The effective intraperitoneal dosage for 50% of mice ($ED_{50}$) is measured in mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings) climb out in a very short time when not treated. When mice remain in the dish for more than 3 minutes, it indicates tranquilization. $ED_{50}$ (in mg./kg.) equals the dose of test compound (intraperitoneal administration) at which 50% of the mice remain in the dish.

Pedestal test: The untreated mouse leaves the pedestal in less than a minute to climb back to the floor of the standard mouse box. Tranquilized mice will stay more than 1 minute. $ED_{50}$ (intraperitioneal administration) is measured in mg./kg.

Anticonvulsive activity is determined by the nicotine antagonism test. Mice in groups of 6 are injected intraperitoneally with the test substance. Thirty minutes later the mice, including control (untreated) mice, are injected with 2 mg./kg. of nicotine salicylate. The control mice show overstimulation, i.e., (1) running convulsions followed by (2) tonic extensor fits followed by (3) death. The $ED_{50}$ (in mg./kg.) is the effective dosage at which the mouse is protected against (1), (2) or (3).

Illustrative test results obtained on compounds of the invention are given in the table.

TABLE

| | $ED_{50}$ (mg./kg.) | | | | | |
|---|---|---|---|---|---|---|
| | CH | Dish | Ped. | Nic (1) | Nic (2) | Nic (3) |
| 5-chloro-2-methyl-3-phenyl-3H-indol-3-ol | 159 | 13 | 112 | >200 | 63 | 63 |
| 5-chloro-2,3-diphenyl-3H-indol-3-ol | 45 | 1.6 | 1.6 | >200 | >200 | >200 |
| 2-methyl-3-phenyl-3H-indol-3-ol | 200 | 3.2 | 25 | | | |
| 2,3-diphenyl-3H-indol-3-ol | 45 | 8 | 35 | >200 | >200 | >200 |
| 2-(p-methoxyphenyl)-3-phenyl-3H-indol-3-ol | 79 | 36 | 63 | >200 | >200 | >200 |
| 3-(p-methoxyphenyl)-2-phenyl-3H-inodl-3-ol | 63 | 126 | 142 | >200 | >200 | >200 |
| 2,3-bis(p-methoxyphenyl)-3H-indol-3-ol | 200 | 178 | 142 | >200 | >200 | >200 |
| 2-(tert.-butyl)-3-phenyl-3H-indol-3-ol | 57 | 63 | 126 | >200 | >200 | 178 |
| 2-methyl-3-(m-trifluoromethylphenyl)-3H-indol-3-ol | 45 | 112 | 100 | >200 | 63 | 63 |
| 2-phenyl-3-(m-trifluoromethylphenyl)-3H-indol-3-ol | 126 | 25 | 89 | >200 | 142 | 142 |

CH=chimney test.
Ped.=pedesti test.
Nic=nicotine antagonism: (1) running convulsions; (2) tonic extensor fits; (3) death.

The pharmaceutical forms of compounds VI contemplated by this invention include pharmaceutical compositions suited for oral, parenteral and rectal use, e.g., tablets, oils, powder packets, cachets, dragées, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used to prepare solutions or suspensions of the active drug. Sweetening, coloring and flavoring agents may be added.

For mammals and birds food premixes with starch, oatmeal, dried fishmeat, fishmeal, flour and the like can be prepared.

As tranquilizer the compounds of Formula VI and the pharmacologically acceptable acid addition salts thereof can be used in dosages of 1 mg.–200 mg./kg. in oral or injectable preparations as described above, to alleviate tension and anxiety in mammals, or birds, such as e.g., occurs when animals are in travel.

Some of the starting materials I of this invention have been described in the literature. Others can be made from 2-methyl-3,1-benzoxazin-4-one by the following processes:

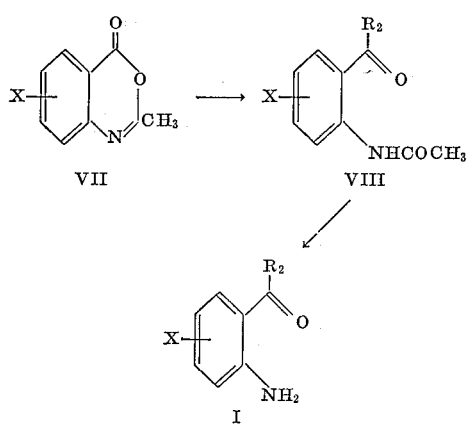

wherein X and $R_2$ have the meaning of above.

This process comprises: treating a 3,1-benzoxazin-4-one of Formula VII with an aryl or alkyl Grignard reagent to give the corresponding o-acetamidephenone (VIII). Compound VIII can then be hydrolyzed to give the o-aminophenone I. Further details of this reaction are shown in the preparations.

In carrying out the process of the present invention, a solution of a selected o-aminophenone (I) is treated in solution with an acid halide of the formula $R_1COCl$ in which $R_1$ is defined as before. The reaction solvent is usually pyridine, or alkylpyridines, tetrahydrofuran and the like. In the preferred embodiment of this invention the acylation is performed at temperatures between −5 and +10° C., but temperatures up to 30° C. are operative. The time of the acylation is from 1 to 8 hours. At the termination of the reaction, the product (II) is isolated by pouring the reaction mixture into water, a precipitate being formed, and collecting the precipitate by filtration or extracting it from the aqueous mixture.

The thus-obtained amido ketone (II) is reduced with a metal hydride, e.g. sodium borohydride, potassium borohydride, and the like in an organic, non-reactive solvent, e.g., methanol, ethanol, propanol and the like.

In the preferred embodiment of this invention, the reduction is carried out with excess sodium borohydride, e.g., 1.5 to 5 times the theoretically required quantity, in ethanol solution, at room temperature (20–30° C.) over a period of 0.5 to 5 hours. Temperatures between 5–35° C. are operative in this reaction. After termination of the reaction, the product is obtained by standard procedures such as eliminating the solvent by vacuum distillation, adding water to the residue and collecting the insoluble organic material by filtration. This material can be recrystallized from organic solvents to give the corresponding amido alcohols of Formula III.

This product III is converted to the 4H-3,1-benzoxazine (IV) by treatment with phosphorus tribromide. In the preferred embodiment of this invention, this reaction is carried out by adding an equimolar amount of phosphorus tribromide to a cooled (to 5° C.) solution of the alcohol (III) in chloroform solution. The reaction mixture is allowed to stand from 1 to 6 hours in the cold and then poured into ice water. The organic layer contains the desired 4H-3,1-benzoxazine which is isolated by conventional procedures, such as evaporating the organic layer, and is purified by crystallization, extraction or chromatography and other conventional procedures.

The 4H-3,1-benzoxazine (IV) is converted to the 3H-indol-3-ol by adding the benzoxazine (IV) in solution to a solution of sodium or potassium amide in liquid ammonia. An approximately 0.1 molar solution of the potassium or sodium amide is prepared and thereto is added a solution of the benzoxazine, preferably in tetrahydrofuran. The amount of potassium or sodium amide is from equimolar to 10% above equimolar compared to the benzoxazine. The reaction period is 5 to 30 minutes and the reaction is stopped by the addition of excess ammonium chloride. After the termination of the reaction the product is obtained by evaporating the solvent, extracting the product with an organic solvent and crystallizing and recrystallizing or chromatographing the product to give the pure 3H-indol-3-ol of Formula V. The etherified and esterified products of Formula VI are made from the compounds of Formula V by conventional procedures which are shown in the examples.

The following preparations and examples are illustrative of the process and products of the present invention, but are not to be construed as limiting.

PREPARATION 1

2'-benzoylacetanilide

A solution of 0.2 mole phenylmagnesium bromide in 200 ml. of tetrahydrofuran was added to an ice-cooled solution of 32.34 g. (0.20 mole) of 2-methyl-3,1-benzoxazin-4-one in 200 ml. ether and 400 ml. benzene over a period of 135 minutes. The mixture was then stirred for 1½ hours at about 0–5° C. and then 1½ hours at about 23–25° C. (room temperature). The reaction mixture was then cooled in ice, 200 ml. of 2.8 N hydrochloric acid was added under stirring while keeping the temperature below 4° C., and after 15 minutes of additional stirring the organic layer was separated, washed successively with water, 5% aqueous sodium hydroxide, water and brine and then evaporated to dryness to give a residue. This residue was chromatographed over Florisil (anhydrous magnesium silicate) with 5% acetone-95% Skellysolve B hexanes (volume percent); fractions containing the desired product were combined, evaporated and the resulting residue recrystallized from Skellysolve B hexanes to give 2'-benzoylacetanilide of melting point 85–88° C.

PREPARATION 2 o-Benzoylaniline

A solution of 0.274 mole of 2'-benzoylacetanilide in a mixture of 37 ml. of hydrochloric acid, 37 ml. of water and 70 ml. of ethanol was heated to reflux for a period of 18 hours. The solvent was removed in vacuo and the resulting residue extracted with methylene chloride. The methylene chloride extract was evaporated in vacuo and the thus-obtained residue recrystallized from Skellysolve B hexanes to give o-benzoylaniline of melting point 105–109° C.

PREPARATION 3

2'-benzoylbenzanilide

To an ice-cold solution of 0.18 mole o-benzoylaniline in 110 ml. of pyridine there was added 22.3 ml. of benzoyl chloride. After standing for 3½ hours at room temperature the mixture was poured into 1300 ml. of water and the solid which formed was collected on a filter, dried and recrystallized from methanol to give 2'-benzoylbenzanilide of melting point 85–88° C.

PREPARATION 4

2'-(p-fluorobenzoyl)acetanilide

A solution of 0.2 mole of p-fluorophenylmagnesium bromide in 200 ml. of tetrahydrofuran was added to an ice-cooled solution of 32.34 g. (0.20 mole) of 2-methyl-3,1-benzoxazin-4-one in 200 ml. ether and 400 ml. benzene over a period of 135 minutes. The mixture was then stirred for 1½ hours at about 0–5° C. and then 1½ hours at about 23–25° C. (room temperature). The reaction mixture was then cooled in ice, 200 ml. of 2.8 N hydrochloric acid was added under stirring while keeping the temperature below 4° C., and after 15 minutes of additional stirring the organic layer was separated, washed successively with water, 5% aqueous sodium hydroxide, water and brine and then evaporated to dryness to give a residue. This residue was chromatographed over Florisil (anhydrous magnesium silicate) with 5% acetone-95% Skellysolve B hexanes (volume percent); fractions 13–19 were combined, evaporated and the resulting residue recrystallized from Skellysolve B hexanes to give 2'-(p-fluorobenzoyl)acetanilide of melting point 85.5–87.5° C.

Analysis.—Calcd. for $C_{15}H_{12}FNO_2$ (percent): C, 70.03; H, 4.70. Found (percent): C, 69.95; H, 4.90.

PREPARATION 5 o-(p-Fluorobenzoyl)aniline

A solution of 0.274 mole of 2'-(p-fluorobenzoyl)acetanilide in a mixture of 37 ml. of hydrochloric acid, 37 ml. of water and 70 ml. of ethanol was heated to reflux for a period of 18 hours. The solvent was removed in vacuo and the resulting residue extracted with methylene chloride. The methylene chloride extract was evaporated in vacuo and the thus-obtained residue recrystallized from ether-Skellysolve B hexanes to give o-(p-fluorobenzoyl)aniline of melting point 124.5–128° C.

Analysis.—Calcd. for $C_{13}H_{10}FNO$ (percent): C, 72.54; H, 4.68. Found (percent); C, 72.96; H, 4.98.

PREPARATION 6

2'-(p-fluorobenzoyl)benzanilide

To an ice-cold solution of 0.18 mole o-(p-fluorobenzoyl)aniline in 110 ml. of pyridine there was added 22.3 ml. of benzoyl chloride. After standing for 3½ hours at room temperature the mixture was poured into 1300 ml. of water and the solid which formed was collected on a filter, dried and recrystallized from methanol to give 2'-(p - fluorobenzoyl)benzanilide of melting point 107–108.5° C.

Analysis.—Calcd. for $C_{20}H_{14}FNO_2$ (percent): C, 75.22; H, 4.42. Found (percent): C, 75.39; H, 4.45.

In the manner given in Preparation 1, other 2'-benzoylacetanilides are prepared by reacting 2-methyl-3,1-benzoxazin-4-one with a selected phenylmagnesium bromide or iodide. Representative products, thus obtained, include:

2'-(p-methoxybenzoyl)acetanilide of melting point 115.5–118.5° C.;
2'-(m-trifluoromethylbenzoyl)acetanilide of melting point 89–91° C.;
2'-(p-methylbenzoyl)acetanilide of melting point 113–115.5° C.;
2'-(m-ethoxybenzoyl)acetanilide;
2'-(p-propoxybenzoyl)acetanilide;
2'-(p-propylbenzoyl)acetanilide;
2'-(p-ethylbenzoyl)acetanilide;
2'-(p-isopropylbenzoyl)acetanilide;
2'-(m-bromobenzoyl)acetanilide;
2'-(o-chlorobenzoyl)acetanilide;
2'-(m-fluorobenzoyl)acetanilide;
2'-benzoyl-4'-chloroacetanilide;
2'-benzoyl-5'-fluoroacetanilide;
2'-(o-bromobenzoyl)-4'methylacetanilide;
2'-(p-ethylbenzoyl)-6'-(trifluoromethyl)acetanilide;

and the like.

In the manner given in Preparation 2, other o-benzoylanilines can be prepared by hydrolyzing selected amides with aqueous mineral acids, e.g., aqueous hydrochloric, hydrobromic, sulfuric acids or the like mineral acids. Representative compounds thus obtained, include:

o-(p-methoxybenzyl)aniline of melting point 73–75.5° C.;
o-(m-trifluoromethylbenzoyl)aniline of melting point 95.5–98° C.;
o-(p-methylbenzoyl)aniline of melting point 90–93° C.;
o-(m-ethoxybenzoyl)aniline;
o-(p-propoxybenzoyl)aniline;
o-(p-propylbenzoyl)aniline;
o-(p-ethylbenzoyl)aniline;
o-(p-isopropylbenzoyl)aniline;
o-(m-bromobenzoyl)aniline;
o-(o-chlorobenzoyl)aniline;
o-(m-fluorobenzoyl)aniline;

2-benzoyl-4-chloroaniline;
2-benzoyl-5-fluoroaniline;
2-(o-bromobenzoyl)-4-methylaniline;
2-(p-ethylbenzoyl)-6-(trifluoromethyl)aniline;
and the like.

In the manner given in Preparation 3, the above-obtained o-benzoylanilines can be reacylated to give the corresponding amide compounds. Representative compounds, thus obtained, include:

2'-benzoyl-4'-chlorobenzanilide of melting point 104–106° C.;
2'-(p-methoxybenzoyl)benzanilide of melting point 116–118° C.;
2'-benzoyl-4-methoxybenzanilide of melting point 94–98° C.;
2'-(p-methoxybenzoyl)-4-methoxybenzanilide of melting point 134–136° C.;
2'-benzoyl-2,2-dimethylpropionanilide of melting point 81.5–83.5° C.;
2'-(m-trifluoromethylbenzoyl)benzanilide of melting point 145–147° C.;
2'-(p-methylbenzoyl)benzanilide of melting point 85–87° C.;
2'-(m-ethoxybenzoyl)benzanilide;
2'-(p-propoxybenzoyl)benzanilide;
2'-(p-propylbenzoyl)benzanilide;
2'-(p-ethylbenzoyl)benzanilide;
2'-(p-isopropylbenzoyl)benzanilide;
2'-(m-bromobenzoyl)benzanilide;
2'-(o-chlorobenzoyl)benzanilide;
2'-(m-fluorobenzoyl)benzanilide;
2'-benzoyl-5'-fluorobenzanilide;
2'-(o-bromobenzoyl)-4'-methylacetanilide;
2'-(p-ethylbenzoyl)-6'-(trifluoromethyl)benzanilide;
and the like.

EXAMPLE 1

α-Hydroxy-α-phenylbenzo-o-toluidide

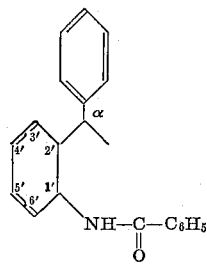

To a stirred mixture of 0.093 mole of 2'-benzoylbenzanilide in 500 ml. of ethanol was added 5.0 g. of sodium borohydride. The mixture was stirred for 2 hours at room temperature (about 23–26° C.), the solvent removed by distillation in vacuo and the resulting residue treated with 200 ml. of water and filtered. The precipitate on the filter was recrystallized from acetone-Skellysolve B hexanes to give in 90% yield α-hydroxy-α-phenylbenzo-o-toluidide of melting point 117–118° C.

EXAMPLE 2

α-Hydroxy-α-phenyl-4'-chloroaceto-o-toluidide

To a stirred mixture of 0.093 mole of 2'-benzoyl-4'-chloroacetanilide in 500 ml. of ethanol was added 5.0 g. of sodium borohydride. The mixture was stirred for 2 hours at room temperature (about 23–26° C.), the solvent removed by distillation in vacuo and the resulting residue treated with 200 ml. of water and filtered. The precipitate on the filter was recrystallized from ethyl acetate-cyclohexane to give in 88% yield α-hydroxy-α-phenyl-4'-chloroaceto-o-toluidide of melting point 134–135.5° C.

EXAMPLE 3

α-Hydroxy-α-(p-methoxyphenyl)benzo-o-toluidide

In the manner given in Example 1, 2'-(p-methoxybenzoyl)benzanilide was reduced with sodium borohydride to give α-hydroxy-α-(p-methoxyphenyl)benzo-o-toluidide of melting point 114–118° C.

Analysis.—Calcd. for $C_{21}H_{19}NO_3$ (percent): C, 75.65; H, 5.74. Found (percent): C, 75.58; H, 5.66.

EXAMPLE 4

α-Hydroxy-α-(p-methoxyphenyl)-p-aniso-o-toluidide

In the manner given in Example 1, 2'-(p-methoxybenzoyl)-4-methoxybenzanilide was reduced with sodium borohydride to give α-hydroxy-α-(p-methoxyphenyl)-p-aniso-o-toluidide of melting point 144–147° C.

Analysis.—Calcd. for $C_{22}H_{21}NO_4$ (percent): C, 72.71; H, 5.82. Found (percent): C, 71.94; H, 5.99.

EXAMPLE 5

α-Hydroxy-α-phenyl-4'-chlorobenzo-o-toluidide

In the manner given in Example 1, 2'-benzoyl-4'-chlorobenzanilide was reduced with sodium borohydride to give α-hydroxy-α-phenyl-4'-chlorobenzo-o-toluidide of melting point 153.5–154° C.

Analysis.—Calcd. for $C_{20}H_{16}ClNO_2$ (percent): C, 71.11; H, 4.78. Found (percent): C, 70.96; H, 4.92.

EXAMPLE 6

α-Hydroxy-α-phenylaceto-o-toluidide

In the manner given in Example 1, 2'-benzoylacetanilide was reduced with sodium borohydride to give α-hydroxy-α-phenylaceto-o-toluidide of melting point 117–120° C.

EXAMPLE 7

α-Hydroxy-α(p-methoxyphenyl)aceto-o-toluidide

In the manner given in Example 1, 2'-(p-methoxybenzoyl)acetanilide was reduced with sodium borohydride to give α-hydroxy-α-(p-methoxyphenyl)aceto-o-toluidide of melting point 136–138° C.

Analysis.—Calcd. for $C_{16}H_{17}NO_3$ (percent): C, 70.83; H, 6.32. Found (percent): C, 70.78; H, 6.22.

EXAMPLE 8

α-Hydroxy-α-(p-fluorophenyl)aceto-o-toluidide

In the manner given in Example 1, 2'-(p-fluorobenzoyl)acetanilide was reduced with sodium borohydride to give α-hydroxy-α-(p-fluorophenyl)aceto-o-toluidide of melting point 102–105° C.

Analysis.—Calcd. for $C_{15}H_{14}FNO_2$ (percent): C, 69.48; H, 5.44. Found (percent): C, 69.64; H, 5.44.

EXAMPLE 9

α-Hydroxy-α-(p-fluorophenyl)benzo-o-toluidide

In the manner given in Example 1, 2'-(p-fluorobenzoyl)benzanilide was reduced with sodium borohydride to give α-(p-fluorophenyl)benzo-o-toluidide of melting point 143–145° C.

EXAMPLE 10

α-Hydroxy-α-(m-trifluoromethylphenyl)benzo-o-toluidide

In the manner given in Example 1, 2'-(m-trifluoromethylbenzoyl)benzanilide was reduced with sodium borohydride to give α-hydroxy-α-(m-trifluoromethylphenyl)-benzo-o-toluidide of melting point 177–179° C.

Analysis.—Calcd. for $C_{21}H_{16}F_3NO_2$ (percent): C, 67.92; H, 4.34. Found (percent): C, 67.98; H, 4.05.

In the manner given in the preceding Examples 1 through 10, other anilides of Formula II are converted to the toluidides III by reduction with a metallic hydride, e.g., sodium borohydride. Representative compounds III, thus produced, include:

α-hydroxy-α-(m-trifluoromethylphenyl)aceto-o-toluidide of melting point 120.5–122.5° C.;

α-hydroxy-α-(p-methylphenyl)aceto-o-toluidide of melting point 108.5–111° C.;
α-hydroxy-α-(p-methylphenyl)benzo-to-toluidide of melting point 127.5–130.5° C.;
α-hydroxy-α-phenyl-(2,2-dimethylpropiano)-o-toluidide of melting point 124–125.5° C.;
α-hydroxy-α-(m-ethoxyphenyl)aceto-o-toluidide;
α-hydroxy-α-(p-propylphenyl)benzo-o-toluidide;
α-hydroxy-α-(p-propoxyphenyl)-benzo-o-toluidide;
α-hydroxy-α-(p-ethylphenyl)aceto-o-toluidide;
α-hydroxy-α-(p-ethylphenyl)benzo-o-toluidide;
α-hydroxy-α-(p-isopropylphenyl)aceto-o-toluidide;
α-hydroxy-α-(m-bromophenyl)aceto-o-toluidide;
α-hydroxy-α-(m-bromophenyl)benzo-o-toluidide;
α-hydroxy-α-(o-chlorophenyl)aceto-o-toluidide;
α-hydroxy-α-(o-chlorophenyl)benzo-o-toluidide;
α-hydroxy-α-benzoyl-5-fluorobenzo-o-toluidide;
α-hydroxy-α-(o-bromobenzoyl)-4'-methylbenzo-o-toluidide;
α-hydroxy-α-(p-ethylbenzoyl)-6'-trifluoromethylbenzo-o-toluidide;
α-hydroxy-α-(p-chlorophenyl)benzo-o-toluidide;
and the like.

EXAMPLE 11

*2,4-diphenyl-4H-3,1-benzoxazine*

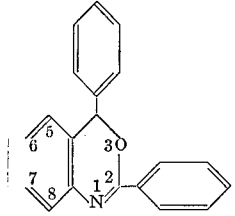

To an ice-cooled solution of 0.0275 mole of α-hydroxy-α-phenylbenzo-o-toluidide in 200 ml. of chloroform was added under stirring 2.6 ml. (7.4 g., 0.0275 mole) of phosphorus tribromide. After standing for 4 hours in the cold the mixture was poured into 300 ml. of ice water, the organic layer was separated, washed in turn with ice cold aqueous sodium bicarbonate solution, water and brine and then evaporated to give a residue. This residue was recrystallized from Skellysolve B hexanes to give (in 83% yield) 2,4 - diphenyl - 4H - 3,1 - benzoxazine of melting point 110–113° C.

EXAMPLE 12

*6-chloro-2,4-diphenyl-4H-3,1-benzoxazine*

In the manner given in Example 11, α - hydroxy - α-phenyl - 4' - chlorobenzo - o - toluidide was treated in the cold with phosphorus tribromide to give (in 72% yield) 6 - chloro - 2,4 - diphenyl - 4H - 3,1 - benzoxazine of melting point 111–115° C.

*Analysis.*—Calcd. for $C_{20}H_{14}ClNO$ (percent): C, 75.11; H, 4.41. Found (percent): C, 74.84; H, 4.37.

EXAMPLE 13

*6-chloro-2-methyl-4-phenyl-4H-3,1-benzoxazine*

In the manner given in Example 11, α - hydroxy - α-phenyl - 4' - chloroaceto - o - toluidide was treated in the cold with phosphorus tribromide to give (in 50% yield) 6 - chloro - 2 - methyl - 4 - phenyl - 4H - 3,1-benzoxazine of melting point 84–87° C.

*Analysis.*—Calcd. for $C_{15}H_{12}ClNO$ (percent): C, 69.90; H, 4.66. Found (percent): C, 70.00; H, 4.88.

EXAMPLE 14

*2-methyl-4-phenyl-4H-3,1-benzoxazine*

In the manner given in Example 11, α - hydroxy - α-phenylaceto - o - toluidide was treated in the cold with phosphorus tribromide to give (in 41% yield) 2-methyl-4-phenyl-4H-3,1-benzoxazine.

EXAMPLE 15

*2-(p-methoxyphenyl)-4-phenyl-4H-3,1-benzoxazine*

In the manner given in Example 11, α - hydroxy - α-phenyl - p - aniso - o - toluidide was treated in the cold with phosphorus tribromide to give (in 91% yield) 2-(p - methoxyphenyl) - 4 - phenyl - 4H - 3,1 - benzoxazine of melting point 115–116° C.

*Analysis.*—Calcd. for $C_{21}H_{17}NO_2$ (percent): C, 79.98; H, 5.43. Found (percent): C, 80.10; H, 4.99.

EXAMPLE 16

*2-phenyl-4-(p-methoxyphenyl)-4H-3,1-benzoxazine*

In the manner given in Example 11, α - hydroxy - α-(p - methoxyphenyl)benzo - o - toluidide was treated in the cold with phosphorus tribromide to give (in 86% yield) 2 - phenyl - 4 - (p - methoxyphenyl) - 4H - 3,1-benzoxazine of melting point 105–107° C.

*Analysis.*—Calcd. for $C_{21}H_{17}NO_2$ (percent): C, 79.98; H, 5.43. Found (percent): C, 80.43; H, 5.97.

EXAMPLE 17

*2,4,-bis(p-methoxyphenyl)-4H-3,1-benzoxazine*

In the manner given in Example 11, α - hydroxy - α-(p - methoxyphenyl) - p - aniso - o - toluidide was treated in the cold with phosphorus tribromide to give (in 89% yield) 2,4 - bis(p - methoxyphenyl) - 4H - 3,1 - benzoxazine of melting point 96–99° C.

*Analysis.*—Calcd. for $C_{22}H_{19}NO_3$ (percent): C, 76.50; H, 5.55. Found (percent): C, 76.25; H, 5.72.

EXAMPLE 18

*2-(t-butyl)-4-phenyl-4H-3,1-benzoxazine*

In the manner given in Example 11, α - hydroxy - α-phenyl - (2,2 - dimethylpropiono) - o - toluidide was treated in the cold with phosphorus tribromide to give (in 81% yields) 2 - (t - butyl) - 4 - phenyl - 4H - 3,1-benzoxazine of melting point 93.5–96° C.

*Analysis.*—Calcd. for $C_{18}H_{19}NO$ (percent): C, 81.47; H, 7.22. Found (percent): C, 81.15; H, 6.50.

EXAMPLE 19

*2-phenyl-4-(p-fluorophenyl)-4H-3,1-benzoxazine*

In the manner given in Example 11, α - hydroxy - α-(p - fluorophenyl)benzo - o - toluidide was treated in the cold with phosphorus toribromide to give (in 51% yield) 2 - phenyl - 4 - (p - fluorophenyl) - 4H - 3,1-benzoxazine of melting point 82–83.5° C.

*Analysis.*—Calcd. for $C_{20}H_{14}FNO$ (percent): C, 79.19; H, 4.65. Found (percent): C, 79.28; H, 4.97.

EXAMPLE 20

*2-methyl-4-(m-trifluoromethylphenyl)-4H-3,1-benzoxazine*

In the manner given in Example 11, α - hydroxy - α-m - trifluoromethylphenyl)aceto - o - toluidide was treated in the cold with phosphorus tribromide to give (in 37% yield) 2 - methyl - 4 - (m - trifluoromethylphenyl)-4H-3,1-benzoxazine.

In the manner given in Example 11, other 4H - 3,1-benzoxazines IV can be prepared by treating toluidides of Formula III with phosphorus tribromide. Representative products, thus obtained, include:

2-phenyl-4-(m-trifluoromethylphenyl)-4H-3,1-benzoxazine;
2-methyl-4-(p-methylphenyl)-4H-3,1-benzoxazine;
2-phenyl-4-(p-methylphenyl)-4H-3,1-benzoxazine of melting point 77–78.5° C.;
2-methyl-4-(p-ethylphenyl)-4H-3,1-benzoxazine;
2-methyl-4-(m-ethoxyphenyl)-4H-3,1-benzoxazine;
2-phenyl-4-(p-propylphenyl)-4H-3,1-benzoxazine;
2-phenyl-4-(p-propoxyphenyl)-4H-3,1-benzoxazine;
2-phenyl-4-(p-ethylphenyl)-4H-3,1-benzoxazine;
2-methyl-4-(p-propylphenyl)-4H-3,1-benzoxazine;

2-methyl-4-(p-isopropylphenyl)-4H-3,1-benzoxazine;
2-phenyl-4-(m-bromophenyl)-4H-3,1-benzoxazine;
2-methyl-4-(m-bromophenyl)-4H-3,1-benzoxazine;
2-methyl-4-(o-chlorophenyl)-4H-3,1-benzoxazine;
2-phenyl-4-(o-chlorophenyl)-4H-3,1-benzoxazine;
2-phenyl-4-(m-fluorophenyl)-4H-3,1-benzoxazine;
2,4-diphenyl-7-fluoro-4H-3,1-benzoxazine;
2-phenyl-4-(o-bromophenyl)-6-methyl-4H-3,1-benzoxazine;
2-phenyl-4-(p-ethylphenyl)-8-trifluoromethyl-4H-3,1-benzoxazine;
and the like.

EXAMPLE 21

5-chloro-2-methyl-3-phenyl-3H-indol-3-ol

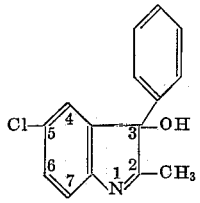

To a solution of 0.80 g. (0.02 mole) of potassium in 200 ml. of redistilled liquid ammonia was added 0.0195 mole of 6-chloro-2-methyl-4-phenyl-4H-3,1-benzoxazine in 60 ml. of tetrahydrofuran. The mixture was stirred for 10 minutes, then 5 g. of ammonium chloride was added, the solvent was evaporated (in a nitrogen atmosphere), and the resulting residue was dissolved in a mixture of ether, methylene chloride and water. The organic layer was separated, washed with water and brine and taken to dryness to give a residue (I). This residue was first chromatographed over Florisil (anhydrous magnesium silicate) with 5% acetone-95% Skellysolve B hexanes (volume percent). Fractions of 400 ml. were collected. Fractions 3-5 containing the desired product were combined and evaporated to give a residue (II). This residue was recrystallized from cyclohexane to give (in 31% yield) 5-chloro-2-methyl-3-phenyl-3H-indol-3-ol of melting point 166-167.5° C.

Analysis.—Calcd. for $C_{15}H_{12}ClNO$ (percent): C, 69.90; H, 4.70. Found (percent): C, 69.83; H, 4.82.

EXAMPLE 22

5-chloro-2,3-diphenyl-3H-indol-3-ol

To a solution of 0.80 g. (0.02 mole) of potassium in 200 ml. of redistilled liquid ammonia was added 0.0195 mole of 6-chloro-2,4-diphenyl-4H-3,1-benzoxazine in 60 ml. of tetrahydrofuran. The mixture was stirred for 10 minutes, then 5 g. of ammonium chloride was added, the solvent was evaporated (in a nitrogen atmosphere), and the resulting residue was dissolved in a mixture of ether, methylene chloride and water. The organic layer was separated, washed with water and brine and evaporated to dryness. The resulting residue was recrystallized from ethyl acetate-cyclohexane to give (in 52% yield) 5-chloro-2,3-diphenyl-3H-indol-3-ol of melting point 223-223.5° C.

Analysis.—Calcd. for $C_{20}H_{14}ClNO$ (percent): C, 75.11; H, 4.41. Found (percent): C, 74.91; H, 5.07.

EXAMPLE 23

2-methyl-3-phenyl-3H-indol-3-ol and 3-methyl-2-phenyl-3H-indol-3-ol

In the manner given in Example 21, 2-methyl-4-phenyl-4H-3,1-benzoxazine was treated with potassium in liquid ammonia to give (in 59% yield) 2-methyl-3-phenyl-3H-indol-3-ol of melting point 189-191° C.

Analysis.—Calcd. for $C_{15}H_{13}NO$ (percent): C, 80.69; H, 5.87. Found (percent): C, 80.66; H, 5.89.

Similarly, 4-methyl-2-phenyl-4H-3,1-benzoxazine was treated with potassium in liquid ammonia to give 3-methyl-2-phenyl-3H-indol-3-ol of melting point 144-145° C.

Analysis.—Calcd. for $C_{15}H_{13}NO$ (percent): C, 80.69; H, 5.87. Found (percent): C, 80.70; H, 6.30.

EXAMPLE 24

2,3-diphenyl-3H-indol-3-ol

In the manner given in Example 21, 2,4-diphenyl-4H-3,1-benzoxazine was treated with potassium in liquid ammonia to give (in 56% yield) 2,3-diphenyl-3H-indol-3-ol of melting point 197-199° C.

Analysis.—Calcd. for $C_{20}H_{15}NO$ (percent): C, 84.18; H, 5.30. Found (percent): C, 84.10; H, 5.18.

EXAMPLE 25

2-(p-methoxyphenyl)-3-phenyl-3H-indol-3-ol

In the manner given in Example 21, 2-(p-methoxyphenyl)-4-phenyl-4H-3,1-benzoxazine was treated with potassium in liquid ammonia to give (in 71% yield) 2-p-methoxyphenyl)-3-phenyl-3H-indol-3-ol of melting point 225-227° C.

Analysis.—Calcd. for $C_{21}H_{17}NO_2$ (percent): C, 79.98; H, 5.43. Found (percent): C, 80.01; H, 5.25.

EXAMPLE 26

2-phenyl-3-(p-methoxyphenyl)-3H-indol-3-ol

In the manner given in Example 21, 2-phenyl-4-(p-methoxyphenyl)-4H-3,1-benzoxazine was treated with potassium in liquid ammonia to give (in 33% yield) 2-phenyl-3-(p-methoxyphenyl)-3H-indol-3-ol of melting point 185-186.5° C.

Analysis.—Calcd. for $C_{21}H_{17}NO_2$ (percent): C, 79.98; H, 5.43. Found (percent): C, 79.67; H, 5.25.

EXAMPLE 27

2,3-bis(p-methoxyphenyl)-3H-indol-3-ol

In the manner given in Example 21, 2,4-bis(p-methoxyphenyl)-4H-3,1-benzoxazine was treated with potassium in liquid ammonia to give (in 49% yield) 2,3-bis(p-methoxyphenyl)-3H-indol-3-ol of melting point 197-198° C.

Analysis.—Calcd. for $C_{22}H_{19}NO_3$ (percent): C, 76.50; H, 5.55. Found (percent): C, 76.37; H, 5.51.

EXAMPLE 28

2-methyl-3-(m-trifluoromethylphenyl)-3H-indol-3-ol

In the manner given in Example 21, 2-methyl-4-(m-trifluoromethylphenyl)-4H-3,1-benzoxazine was treated with potassium in liquid ammonia to give (in 23% yield) 2-methyl-3-(m-trifluoromethylphenyl)-3H-indol-3-ol of melting point 148-149° C.

Analysis.—Calcd. for $C_{16}H_{12}F_3NO$ (percent): C, 65.97; H, 4.15. Found (percent): C, 65.83; H, 4.33.

EXAMPLE 29

2-phenyl-3-(p-fluorophenyl)-3H-indol-c-ol

In the manner given in Example 21, 2-phenyl-4-(p-fluorophenyl)-4H-3,1-benzoxazine was treated with potassium in liquid ammonia to give (in 33% yield) 2-phenyl-3-(p-fluorophenyl)-3H-indol-3-ol of melting point 200-202° C.

Analysis.—Calcd. for $C_{20}H_{14}FNO$ (percent): C, 79.27; H, 4.66. Found (percent): C, 78.69; H, 4.80.

EXAMPLE 30

2-phenyl-3-(p-methylphenyl)-3H-indol-3-ol

In the manner given in Example 21, 2-phenyl-4-(p-methylphenyl)-4H-3,1-benzoxazine was treated with potassium in liquid ammonia to give 2-phenyl-3-(p-methylphenyl)-3H-indol-3-ol of melting point 208-212° C.

Analysis.—Calcd. for $C_{21}H_{17}NO$ (percent): C, 84.25; H, 5.72. Found (percent): C, 83.95; H, 5.66.

In the manner given in Example 21, other 3H-indol-3-ols of Formula V can be prepared by reacting a selected 4H-3,1-benzoxazine of Formula IV with sodium or potassium in liquid ammonia. Representative 3H-indol-3- ols, thus obtained, include 2-(t-butyl)-3-phenyl-3H-indol-3-ol of melting point 160–162° C. as a tranquilizer;

2-phenyl-3-(m-trifluoromethylphenyl) - 3H - indol-3-ol of melting point 206–208° C.;
2 - methyl - 3-(p-methylphenyl)-3H-indol-3-ol of melting point 156.5–158° C.;
2-phenyl-3-(m-ethoxyphenyl)-3H-indol-3-ol;
2-methyl-3-(m-ethoxyphenyl)-3H-indol-3-ol;
2-phenyl-3-(p-propylphenyl)-3H-indol-3-ol;
2-phenyl-3-(p-propoxyphenyl)-3H-indol-3-ol;
2-phenyl-3-(p-ethylphenyl)-3H-indol-3-ol;
2-methyl-3-(p-ethylphenyl)-3H-indol-3-ol;
2-methyl-3-(p-isopropylphenyl)-3H-indol-3-ol;
2-phenyl-3-(m-bromophenyl)-3H-indol-3-ol;
2-methyl-3-(m-bromophenyl)-3H-indol-3-ol;
2-methyl-3-(o-chlorophenyl)-3H-indol-3-ol;
2-phenyl-3-(m-fluorophenyl)-3H-indol-3-ol;
2-(o-methoxyphenyl)-3-(o-fluorophenyl)-3H-indol-3-ol;
2-(p-ethoxyphenyl)-3-(o-chlorophenyl)-3H-indol-3-ol;
2,3-diphenyl-6-fluoro-3H-indol-3-ol;
2-phenyl-3-(o-bromophenyl)-5-methyl-3H-indol-3-ol;
2-phenyl-3-(p-ethylphenyl)-7-trifluoromethyl-3H-indol-3-ol;
and the like.

EXAMPLE 31

3-benzyloxy-2,3-diphenyl-3H-indole

To a solution of 1.43 g. of 2,3-diphenyl-3H-indol-3-ol in 8 ml. of dimethylformamide and 40 ml. of benzene there was added 0.24 g. of sodium hydride (56% in mineral oil) and after 15 minutes 0.90 g. of benzyl chloride. Following 3 hours of heating at reflux, the mixture was allowed to cool, washed in turn with water and brine and taken to dryness. The residue was chromatographed over Florisil (anhydrous magnesium silicate) (elution with 5% acetone–95% Skellysolve B hexanes, volume percent) and then over silica gel (same eluant). The crystalline fractions obtained from this last column were combined and recrystallized twice from a small volume of methanol. There was obtained 1.16 g. (62% yield) of colorless 3-benzyloxy-2,3-diphenyl-3H-indole of melting point 107–110° C.

Analysis.—Calcd. for $C_{27}H_{21}NO$ (percent): C, 86.37; H, 5.64. Found (percent): C, 85.41; H, 5.77.

EXAMPLE 32

[(2,3-diphenyl-3H-indol-3-yl)oxy]acetic acid and the ethyl ester thereof

To a solution of 2.85 g. of 2,3-diphenyl-3H-indol-3-ol in 15 ml. of dimethylformamide and 80 ml. of benzene there was added 0.43 g. of sodium hydride (56% in mineral oil). After 5 minutes 1.1 ml. (1.67 g.) of ethyl bromoacetate was added and the mixture was brought to reflux. At the end of 6 hours the mixture was allowed to cool, washed with water and brine and taken to dryness to give ethyl [(2,3-diphenyl-3H-indol-3-yl)oxy]acetate.

A solution of the ester and 2 ml. of 50% aqueous sodium hydroxide in 40 ml. of methanol was heated at reflux for 6 hours. The bulk of the solvent was then removed in vacuo and the residue was dissolved in ether and water. The aqueous layer was acidified to afford the crude acid. Two recrystallizations from aqueous methanol gave 1.46 g. (43% yield) of colorless [(2,3-diphenyl-3H-indol-3-yl)oxy]acetic acid of melting point 200–201.5° C.

Analysis.—Calcd. for $C_{22}H_{17}NO_3$ (percent): C, 76.95; H, 4.95. Found (percent): C, 75.88; H, 5.06.

EXAMPLE 33

[[2,3-bis(p-methoxyphenyl)-3H-indol-3-yl]oxy]-acetic acid

In the manner given in Example 32, 2.0 g. of 2,3-bis(p-methoxyphenyl)-3H-indol-3-ol was alkylated by means of 0.25 g. of sodium hydride (56% in mineral oil) and 0.97 g. of ethyl bromoacetate. The crude ester was hydrolyzed with 3 ml. of 50% aqueous sodium hydroxide in 100 ml. of methanol. The aqueous portion of the reaction mixture was acidified with hydrochloric acid and the crude acid thus obtained was recrystallized twice from aqueous methanol to give 1.23 g. (52% yield) of [[2,3-bis(p-methoxyphenyl)-3H-indol-3-yl]oxy]acetic acid of melting point 191–192° C.

Analysis.—Calcd. for $C_{24}H_{21}NO_5$ (percent): C, 71.45; H, 5.25. Found (percent): C, 71.50; H, 5.19.

EXAMPLE 34

3-acetoxy-5-chloro-2,3-diphenyl-3H-indole

A mixture of 2.0 g. of 5-chloro-2,3-diphenyl-3H-indol-3-ol, 4 ml. of acetic anhydride and 12 ml. of pyridine was allowed to stand at room temperature for 16 days. The solid which was obtained when the mixture was poured into water was recrystallized twice from methanol to give 1.28 g. of 3-acetoxy-5-chloro-2,3-diphenyl-3H-indole of melting point 156.5–160° C.

Analysis.—Calcd. for $C_{22}H_{16}ClNO_2$ (percent): C, 73.03; H, 4.46. Found (percent): C, 73.33; H, 4.71.

EXAMPLE 35

3-acetoxy-2,3-diphenyl-3H-indole

A solution of 2.0 g. of 2,3-diphenyl-3H-indol-3-ol and 5 ml. of acetic anhydride in 15 ml. of pyridine was allowed to stand at room temperature for one week. The mixture was then poured into ice and water. The resulting precipitated solid was collected on a filater and recrystallized several times from acetone-cyclohexane. There was obtained 1.51 g. (58% yield) of 3-acetoxy-2,3-diphenyl-3H-indole of melting point 167–170° C.

Analysis.—Calcd. for $C_{22}H_{17}NO_2$ (percent): C, 80.71: H, 5.23. Found (percent): C, 80.76; H, 5.63.

EXAMPLE 36

3-benzyloxy-2-(p-methoxyphenyl)-3-phenyl-3H-indole

In the manner given in Example 31, treating 2-(p-methoxyphenyl)-3-phenyl-3H-indol-3-ol first with sodium hydride and then with benzyl bromide gave 3-benzyloxy-2-(p-methoxyphenyl)-3-phenyl-3H-indole.

EXAMPLE 37

3-benzyloxy-2-methyl-3-phenyl-3H-indole

In the manner given in Example 31, 2-methyl-3-phenyl-3H-indol-3-ol was treated with sodium hydride and then with benzyl chloride to give 3-benzyloxy-2-methyl-3-phenyl-3H-indole.

EXAMPLE 38

3-benzyloxy-2-phenyl-3-(p-methoxyphenyl)-3H-indole

In the manner given in Example 31, 2-phenyl-3-(p-methoxyphenyl)-3H-indol-3-ol was treated with sodium hydride and then with benzyl chloride to give 3-benzyloxy-2-phenyl-3-(p-methoxyphenyl)-3H-indole.

EXAMPLE 39

3-benzyloxy-2-methyl-3-(m-trifluoromethylphenyl)-3H-indole

In the manner given in Example 31, 2-methyl-3-(m-trifluoromethylphenyl)-3H-indol-3-ol was treated with sodium hydride and then with benzyl chloride to give 3 - benzyloxy - 2-methyl-3-(m-trifluoromethylphenyl)-3H-indole.

EXAMPLE 40

3-benzyloxy-2-phenyl-3-(p-fluorophenyl)-3H-indole

In the manner given in Example 31, 2-phenyl-3-(p-fluorophenyl)-3H-indol-3-ol was treated with sodium hydride and then with benzyl chloride to give 3-benzyloxy-2-phenyl-3-(p-fluorophenyl)-3H-indole.

EXAMPLE 41

[[2-(p-methoxyphenyl)-3-phenyl-3H-indol-3-yl]oxy]-
acetic acid and the ethyl ester thereof In the manner given in Example 32, 2-(p-methoxyphenyl)-3-phenyl-3H-indol-3-ol was first reacted with sodium hydride and shortly thereafter with ethyl bromoacetate to give ethyl [[2-(p-methoxyphenyl)-3-phenyl-3H-indol-3-yl]oxy]acetate.

Hydrolysis of this ester with sodium hydroxide in methanol as in Example 32, followed by treatment of the salt with acid, gave [[2-(p-methoxyphenyl)-3-phenyl-3H-indol-3-yl]oxy]acetic acid.

EXAMPLE 42

2-[[2-phenyl-3-(p-fluorophenyl)-3H-indol-3-yl]oxy]-
propionic acid and the methyl ester thereof In the manner given in Example 32, 2-phenyl-3-(p-fluorophenyl)-3H-indol-3-ol was first reacted with sodium hydride and shortly thereafter with methyl 2-bromopropionate to give methyl 2-[[2 - phenyl-3-(p-fluorophenyl)-3H-indol-3-yl]oxy]-propionate.

Hydrolysis of this ester with sodium hydroxide in methanol as in Example 32, followed by acidification, gave 2 - [[2 - phenyl - 3 - (p - fluorophenyl-3H-indol-3-yl]oxy]propionic acid.

EXAMPLE 43

[[2-phenyl-3-(m-trifluoromethylphenyl)-3H-indol-3-
yl]oxy]acetic acid and the ethyl ester thereof In the manner given in Example 32, 2-phenyl-3-(m-trifluoromethylphenyl) - 3H - idol-3-ol was first reacted with sodium hydride and shortly thereafter with ethyl bromoacetate to give ethyl [[2-phenyl - 3 - (m-trifluoromethylphenyl) - 3H - indol-3-yl]oxy]acetate.

Hydrolysis of this ester with sodium hydroxide in methanol as in Example 32, followed by acidification, gave [[2 - phenyl - 3 - (m-trifluoromethylphenyl)-3H-indol-3-yl]oxy]acetic acid.

EXAMPLE 44

2-[[2,3-bis(p-methoxyphenylQ3H-indol-3-yl]oxy]
propionic acid and the ethyl ester thereof In the manner given in Example 32, 2 - methyl-3-(p-fluorophenyl) - 3H - indol-3-ol was first reacted with sodium hydride and shortly thereafter with ethyl 2-bromopropionate to give ethyl 2-[[2 - methyl - 3 - (p-fluorophenyl) - 3H - indol - 3 - yl]oxy]propionate.

Hydrolysis of this ester with sodium hydroxide in methanol as in Example 32, followed by acidification, gave 2 - [[2 - methyl - 3 - (p - fluorophenyl) - 3H - indol-3-yl]oxy]propionic acid.

EXAMPLE 45

2-[[2,3-bis(p-methoxyphenyl)-3H-indol-3-yl]oxy]
propionic acid and the butyl ester thereof In the manner given in Example 32, 2,3-bis(p-methoxyphenyl) - 3H - indol-3-ol was first reacted with sodium hydride and shortly thereafter with butyl 2 - bromopropionate to give butyl 2-[[2,3 - bis(p-methoxyphenyl)-3H-indol-3-yl]oxy]propionate.

Hydrolysis of this ester with sodium hydroxide in methanol as in Example 32, followed by acidification, gave 2 - [[2,3 - bis(p-methoxyphenyl) - 3H - indol-3-yl]oxy]propionic acid.

EXAMPLE 46

3-propionyloxy-5-chloro-2-methyl-3-phenyl-3H-indole

In the manner given in Example 34, 5 - chloro-2-methyl - 3 - phenyl - 3H - indol-3-ol was treated in pyridine solution with propionic anhydride to give 3-propionyloxy-5-chloro-2-methyl-3-phenyl-3H-indole.

EXAMPLE 47

3-butyryloxy-2-methyl-3-(m-trifluoromethylphenyl)-
3H-indole

In the manner given in Example 34, 2-methyl-3-(m-trifluoromethylphenyl) - 3H - indol-3-ol was reacted with butyric anhydride in pyridine to give 3 - butyryloxy-2-methyl-3-(m-trifluoromethylphenyl)-3H-indole.

EXAMPLE 48

3-propionyloxy-2-phenyl-3-(m-ethoxyphenyl)-
3H-indole

In the manner given in Example 34, 2-phenyl-3-(m-ethoxyphenyl)-3H-indol-3-ol was reacted with propionic anhydride in pyridine to give 3-propionyloxy-2-phenyl-3-(m-ethoxyphenyl)-3H-indole.

EXAMPLE 49

3-acetoxy-2-phenyl-3-(p-fluorophenyl)-
3H-indole

In the manner given in Example 34, 2-phenyl-3-(p-fluorophenyl) - 3H - indol - 3 - ol was reacted with acetic anhydride in pyridine to give 3-acetoxy - 2 - phenyl-3-(p-fluorophenyl)-3H-indole.

EXAMPLE 50

3-butyryloxy-2-methyl-3-(m-bromophenyl)-
3H-indole

In the manner given in Example 34, 2-methyl-3-(m-bromophenyl) - 3H - indol-3-ol was reacted with butyric anhydride in pyridine to give 3-butyryloxy - 2 - methyl-3-(m-bromophenyl)-3-indole.

In the manner given in Example 31, other benzyl ethers of 3H-indol-3-ols (VI) are prepared by reacting selected 3H-indol-3-ols (V) first with a strong base such as sodium or potassium hydride and then with benzyl chloride or bromide. Representative ethers thus prepared include:

3-benzyloxy-2-methyl-3-(p-methylphenyl)-3H-indole;
3-benzyloxy-2-phenyl-3-(m-ethoxyphenyl)-3H-indole;
3-benzyloxy-2-phenyl-3-(p-propylphenyl)-3H-indole;
3-benzyloxy-2-phenyl-3-(p-propoxyphenyl)-3H-indole;
3-benzyloxy-2-phenyl-3-(p-ethylphenyl)-3H-indole;
3-benzyloxy-2-methyl-3-(p-ethylphenyl)-3H-indole;
3-benzyloxy-2-methyl-3-(p-isopropylphenyl)-3H-indol;
3-benzyloxy-2-phenyl-3-(m-bromophenyl)-3H-indole;
3-benzyloxy-2-methyl-3-(m-bromophenyl)-3H-indole;
3-benzyloxy-2-methyl-3-(o-chlorophenyl)-3H-indole;
3-benzyloxy-2-phenyl-3-(m-fluorophenyl)-3H-indole;
3-benzyloxy-2-(o-methoxyphenyl)-3-(o-fluorophenyl)-3H-indole;
3-benzyloxy-2,3-diphenyl-6-fluoro-3H-indole;
3-benzyloxy-2-phenyl-3-(o-bromophenyl)-5-methyl-3H-indole;
3-benzyloxy-2-phenyl-3-(p-ethylphenyl)-7-trifluoromethyl-3H-indole;

and the like.

In the manner given in Example 32, oxyacids and esters thereof are produced from 3H-indol-3-ols (V) by reacting V with sodium or potassium hydride and a 2-bromo- or 2-chloroacid ester of the formula

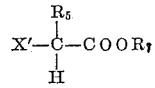

wherein X' is chlorine or bromine, $R_5$ is hydrogen or methyl, and $R_7$ is alkyl of 1 to 4 carbon atoms, inclusive. The thus produced ester can be hydrolyzed with sodium or potassium hydroxide or carbonate to give the corresponding 3H-indol-3-oxyacid (VI). Representative compounds, thus obtained, include:

[[2-methyl-3-(p-methylphenyl)-3H-indol-3-yl]
oxy]acetic acid;

[[2-phenyl-3-(m-ethoxyphenyl)-3H-indol-3-yl]
 oxy]acetic acid;
[[2-phenyl-3-(p-propoxyphenyl)-3H-indol-3-yl]
 oxy]acetic acid;
[[2-phenyl-3-(m-bromophenyl)-3H-indol-3-yl]
 oxy]acetic acid;
[[2-methyl-3-(o-chlorophenyl)-3H-indol-3-yl]
 oxy]acetic acid;
2-[[2-phenyl-3-(p-propylphenyl)-3H-indol-3-yl]
 oxy]propionic acid;
2-[[2-(o-methoxyphenyl)-3-(o-fluorophenyl)-3H-indol-
 3-yl]oxy]propionic acid;
2-[[2-methyl-3-(p-isopropylphenyl)-3H-indol-3-yl]
 oxy]propionic acid;
2-[[2-phenyl-3-(p-ethylphenyl)-3H-indol-3-yl]
 oxy]propionic acid;
2-[[2-phenyl-3-(m-trifluoromethylphenyl)-3H-indol-
 3-yl]oxy]propionic acid;
2-[[2-methyl-3-(o-chlorophenyl)-3H-indol-3-yl]
 oxy]propionic acid;
2-[[2-phenyl-3-(o-chlorophenyl)-3H-indol-3-yl]
 oxy]propionic acid;
2-[[2-phenyl-3-(m-ethoxyphenyl)-3H-indol-3-yl]
 oxy]propionic acid;
2-[[2-methyl-3-(p-propylphenyl)-3H-indol-3-yl]
 oxy]propionic acid;
[(2,3-diphenyl-6-fluoro-3H-indol-3-yl)oxy]
 oxy]propionic acid;
2-[[2-phenyl-3-(o-bromophenyl)-5-methyl-3H-indol-
 3-yl]oxy]propionic acid;
2-[[2-phenyl-3-(p-ethylphenyl)-7-(trifluoromethyl)-
 3H-indol-3-yl]oxy]propionic acid;
the methyl, ethyl, propyl, isopropyl, butyl, isobutyl esters
 thereof and the like.

In the manner given in Example 34, treating selected 3H-indol-3-ols (V) with an acid anhydride (acetic, propionic, butyric or isobutyric anhydride) in pyridine produces the corresponding ester. Representative compounds, thus obtained, include:

3-acetoxy-, 3-propionyloxy-, 3-butyryloxy- and 3-isobutyryloxy- substituted-
5-chloro-2,3-diphenyl-3H-indole;
2-methyl-3-(p-methylphenyl)-3H-indole;
2-phenyl-3-(m-ethoxyphenyl)-3H-indole;
2-phenyl-3-(p-propylphenyl)-3H-indole;
2-phenyl-3-(p-propoxyphenyl)-3H-indole;
2-phenyl-3-(p-ethylphenyl)-3H-indole;
2-methyl-3-(p-ethylphenyl)-3H-indole;
2-methyl-3-(p-isopropylphenyl)-3H-indole;
2-methyl-3-(m-bromophenyl)-3H-indole;
2-methyl-3-(o-chlorophenyl)-3H-indole;
2-methyl-3-(m-fluorophenyl)-3H-indole;
2-phenyl-3-(m-fluorophenyl)-3H-indole;
2-(o-methoxyphenyl)-3-(o-fluorophenyl)-3H-indole;
2,3-bis(p-methoxyphenyl)-3H-indole;
2,3-diphenyl-6-fluoro-3H-indole;
2-phenyl-3-(o-bromophenyl)-5-methyl-3H-indole;
2-phenyl-3-(p-ethylphenyl)-7-(trifluoromethyl)-3H-
 indole;
and the like.

I claim:
1. A compound of the formula

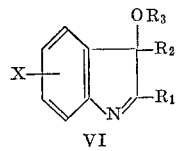

VI wherein X is selected from the group consisting of hydrogen, alkyl of 1 to 3 carbon atoms, inclusive, halogen and —$CF_3$; wherein $R_1$ and $R_2$ are phenyl of the formula —$C_6H_4Z$ in which Z is selected from the group consisting of hydrogen, alkyl defined as above, alkoxy of 1 to 3 carbon atoms, inclusive, halogen and —$CF_3$, or one of the parameters $R_1$ and $R_2$ is alkyl defined as above; and wherein $R_3$ is selected from the group consisting of hydrogen, benzyl,

in which $R_4$ is alkyl defined as above, and

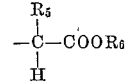

in which $R_5$ is selected from the group consisting of hydrogen and methyl and $R_6$ is selected from the group consisting of hydrogen and alkyl of 1 to 4 carbon atoms, inclusive.

2. A compound according to claim 1 wherein X is 5-chloro, $R_1$ is methyl, $R_2$ is phenyl, $R_3$ is hydrogen and the compound is therefore 5-chloro-2-methyl-3-phenyl-3H-indol-3-ol.

3. A compound according to claim 1 wherein X is 5-chloro, $R_1$ and $R_2$ are phenyl, $R_3$ is hydrogen and the compound is therefore 5-chloro-2,3-diphenyl-3H-indol-3-ol.

4. A compound according to claim 1 wherein X and $R_3$ are hydrogen, $R_1$ is methyl, $R_2$ is phenyl and the compound is therefore 2-methyl-3-phenyl-3H-indol-3-ol.

5. A compound according to claim 1 wherein X and $R_3$ are hydrogen, $R_1$ is phenyl, $R_2$ is methyl and the compound is therefore 3-methyl-2-phenyl-3H-indol-3-ol.

6. A compound according to claim 1 wherein X and $R_3$ are hydrogen, $R_1$ and $R_2$ are phenyl and the compound is therefore 2,3-diphenyl-3H-indol-3-ol.

7. A compound according to claim 1 wherein X and $R_3$ are hydrogen, $R_1$ is p-methoxyphenyl, $R_2$ is phenyl and the compound is therefore 2-(p-methoxyphenyl)-3-phenyl-3H-indol-3-ol.

8. A compound according to claim 1 wherein X and $R_3$ are hydrogen, $R_1$ is phenyl, $R_2$ is p-methoxyphenyl and the compound is therefore 2-phenyl-3-(p-methoxyphenyl)-3H-indol-3-ol.

9. A compound according to claim 1 wherein X and $R_3$ are hydrogen, $R_1$ and $R_2$ are p-methoxyphenyl and the compound is therefore 2,3-bis(p-methoxyphenyl)-3H-indol-3-ol.

10. A compound according to claim 1 wherein X and $R_3$ are hydrogen, $R_1$ is methyl, $R_2$ is m-trifluoromethylphenyl and the compound is therefore 2-methyl-3-(m-trifluoromethylphenyl)-3H-indol-3-ol.

11. A compound according to claim 1 wherein X and $R_3$ are hydrogen, $R_1$ is phenyl, $R_2$ is m-trifluoromethylphenyl and the compound is therefore 2-phenyl-3-(m-trifluoromethylphenyl)-3H-indol-3-ol.

12. A compound according to claim 1 wherein X and $R_3$ are hydrogen, $R_1$ is phenyl, $R_2$ is p-fluorophenyl and the compound is therefore 2-phenyl-3-(p-fluorophenyl)-3H-indol-3-ol.

13. A compound according to claim 1 wherein X and $R_3$ are hydrogen, $R_1$ is methyl, $R_2$ is p-methylphenyl and the compound is therefore 2-methyl-3-(p-methylphenyl)-3H-indol-3-ol.

14. A compound according to claim 1 wherein X and $R_3$ are hydrogen, $R_1$ is phenyl, $R_2$ is p-methylphenyl and the compound is therefore 2-phenyl-3-(p-methylphenyl)-3H-indol-3-ol.

15. A compound according to claim 1 wherein X is 5-chloro, $R_3$ is acetyl, $R_1$ and $R_2$ are phenyl and the compound is therefore 3-acetoxy-5-chloro-2,3-diphenyl-3H-indole.

16. A compound according to claim 1 wherein X is hydrogen, $R_1$ and $R_2$ are phenyl, $R_3$ is acetyl and the compound is therefore 3-acetoxy-2,3-diphenyl-3H-indole.

17. A compound according to claim 1 wherein X is hydrogen, $R_1$ and $R_2$ are phenyl, $R_3$ is —$CH_2$—COOH and the compound is therefore [(2,3-diphenyl-3H-indol-3-yl)oxy]acetic acid.

18. A compound according to claim 1 wherein X is hydrogen, $R_1$ and $R_2$ are p-methoxyphenyl, $R_3$ is —$CH_2$—COOH and the compound is therefore [[2,3-bis-(p-methoxyphenyl)-3H-indol-3-yl]oxyl]acetic acid.

19. A compound according to claim 1 wherein X is hydrogen, $R_1$ and $R_2$ are phenyl, $R_3$ is benzyl and the compound is therefore 3-benzyloxy-2,3-diphenyl-3H-indole.

20. 2-(t-butyl)-3-phenyl-3H-indol-3-ol.

21. A process for the production of 2,3-disubstituted 3H-indol-3-ols of the Formula V:

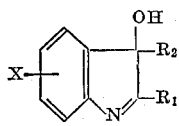
V wherein X is selected from the group consisting of hydrogen, alkyl of 1 to 3 carbon atoms, inclusive, halogen and —$CF_3$; wherein $R_1$ and $R_2$ are phenyl of the formula —$C_6H_4Z$ in which Z is selected from the group consisting of hydrogen, alkyl defined as above, alkoxy of 1 to 3 carbon atoms, inclusive, halogen and —$CF_3$, or one of the parameters $R_1$ and $R_2$ is alkyl defined as above, which comprises:

(1) acylating at —5 to +30° C. with an acyl chloride of the formula $R_1COCl$, wherein $R_1$ is defined as above, an o-aminophenone (I) of the formula:

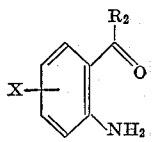
I wherein $R_2$ and X are defined as above, in pyridine or alkylated pyridine, to obtain the N-acyl derivative II of the o-aminophenone I;

(2) reducing II at 5 to 35° C. with a metal hydride selected from the group consisting of sodium and potassium borohydride to obtain the amido alcohol III:

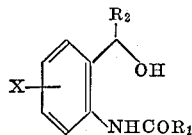
III wherein X, $R_1$, and $R_2$ are defined as above;

(3) treating III with phosphorus tribromide at about 5° C. in chloroform to give the corresponding 4H-3,1-benzoxazine IV of the formula:

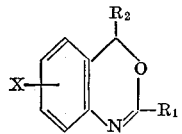
IV wherein $R_1$, $R_2$, and X are defined as above;

(4) adding IV to sodium or potassium amide in liquid ammonia to obtain the 2,3-disubstituted 3H-indol-3-ol of formula V above.

22. The process of claim 21 wherein the 3H-indol-3-ol V is esterified with an acid anhydride in pyridine at room temperature of a hydrocarbon carboxylic acid of 2 to 4 carbon atoms, inclusive, to give a compound of the formula

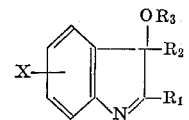
VI wherein X is selected from the group consisting of hydrogen, alkyl of 1 to 3 carbon atoms, inclusive, halogen and —$CF_3$; wherein $R_1$ and $R_2$ are phenyl of the formula —$C_6H_4Z$ in which Z is selected from the group consisting of hydrogen, alkyl defined as above, alkoxy of 1 to 3 carbon atoms, inclusive, halogen and —$CF_3$, or one of the parameters $R_1$ and $R_2$ is alkyl defined as above; and wherein $R_3$ is

in which $R_4$ is alkyl defined as above.

23. The process of claim 2 wherein the 3H-indol-3-ol V is etherified by treating V with sodium hydride at room temperature followed by heating with benzyl halide.

24. The process of claim 21 wherein the 3H-indol-3-ol V in dimethylformamide-benzene was treated with sodium hydride and then heated with a halo ester of the formula

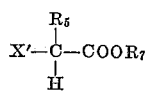

in which X' is selected from the group consisting of chlorine and bromine, $R_5$ is selected from the group consisting of hydrogen and methyl, and $R_7$ is alkyl of 1 to 4 carbon atoms, inclusive, to obtain the corresponding ester and hydrolyzing the ester with aqueous sodium or potassium hydroxide to obtain the 3H-indol-3-oxyacid of the formula:

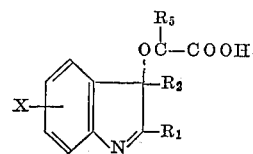

wherein X is selected from the group consisting of hydrogen, alkyl of 1 to 3 carbon atoms, inclusive, halogen and —$CF_3$; wherein $R_1$ and $R_2$ are phenyl of the formula —$C_6H_4Z$ in which Z is selected from the group consisting of hydrogen, alkyl defined as above, alkoxy of 1 to 3 carbon atoms, inclusive, halogen and —$CF_3$, or one of the parameters $R_1$ and $R_2$ is alkyl defined as above; and wherein $R_5$ is defined as above.

References Cited

UNITED STATES PATENTS 3,182,071   5/1965   Shavel et al. _____ 260—326.13

ALEX MAZEL, Primary Examiner

J. A. NARCAVAGE, Assistant Examiner

U.S. Cl. X.R.

260—244 R, 326.15, 558 R, 559 R; 424—274

UNITED STATES PATENT OFFICE
CERTIFICATE OF CORRECTION

Patent No. 3,634,455    Dated January 11, 1972

Inventor(s) Daniel Lednicer

It is certified that error appears in the above-identified patent and that said Letters Patent are hereby corrected as shown below:

Column 1, line 21, for "of -CF₃" read -- or -CF₃ --. Column 2, line 40, for "X is" read -- X' is --; line 71, for "intraperitioneal" read -- intraperitoneal --. Column 3, line 4, for "intraperitioneal" read -- intraperitoneal --; line 25, for "inodl-3-ol" read -- indol-3-ol --; line 30, for "pedestl" read -- pedestal --. Column 6, line 54, for ")-4'methyl" read -- )-4'-methyl --; line 64, for "benzyl)" read -- benzoyl) --. Column 7, Example 1, Formula, should appear as shown below instead of as in the patent:

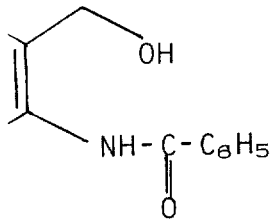

Column 8, line 36, for "-α(p-" read -- -α-(p- --. Column 9, line 5, for "propiano)-o-" read -- propiono)-o- --; line 17, for "benzoyl-5-" read -- benzoyl-5'- --; Example 11, Formula, should appear as shown below instead of as in the patent:

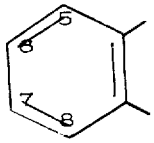

FORM PO-1050 (10-69)

Page 2

UNITED STATES PATENT OFFICE
CERTIFICATE OF CORRECTION

Patent No. 3,634,455                    Dated   January 11, 1972

Inventor(s)  Daniel Lednicer

It is certified that error appears in the above-identified patent and that said Letters Patent are hereby corrected as shown below:

Column 10, line 23, for "2,4,-Bis" read -- 2,4-Bis --; line 37, for "yields)" read -- yield) --; line 46, for "toribromide" read -- tribromide --; line 56, for "α-m-" read -- α-(m- --. Column 12, line 54, for "indol-c-ol" read -- indol-3-ol --. Column 14, line 26, for "2.0 g." read -- 2.30 g. --; line 31, for "filater" read -- filter --. Column 15, line 25, for "-3H-" read -- )-3H- --; line 33, for "idol" read -- indol --; lines 42-43, for "2-[[2,3-bis(p-methoxyphenyl@3H-indol-3-yl]oxy] propionic acid and ethyl ester thereof" read -- 2-[[2-Methyl-3-(p-fluorophenyl)-3H-indol-3-yl]oxy]propionic acid and the ethyl ester thereof --. Column 16, line 33, for "3-indole" read -- 3H-indole --; line 46, for "indol" read -- indole --. Column 17, line 28, for "3-yl)oxy]oxy]" read -- 3-yl)oxy] --. Column 20, line 21, for "claim 2" read -- claim 21 --.

Signed and sealed this 25th day of July 1972.

(SEAL)
Attest:

EDWARD M. FLETCHER, JR.            ROBERT GOTTSCHALK
Attesting Officer                  Commissioner of Patents